(12) United States Patent
Gupta (10) Patent No.: US 11,301,366 B2
(45) Date of Patent: Apr. 12, 2022

(54) TEST AUTOMATION SYSTEMS AND METHODS USING LOGICAL IDENTIFIERS

(71) Applicant: VMware, Inc., Palo Alto, CA (US)

(72) Inventor: Amit Gupta, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 523 days.

(21) Appl. No.: 16/408,841

(22) Filed: May 10, 2019

(65) Prior Publication Data

US 2020/0356469 A1    Nov. 12, 2020

(51) Int. Cl.
*G06F 11/00* (2006.01)
*G06F 11/36* (2006.01)
*G06F 3/0484* (2022.01)

(52) U.S. Cl.
CPC ........ *G06F 11/3688* (2013.01); *G06F 3/0484* (2013.01); *G06F 11/3684* (2013.01)

(58) Field of Classification Search
CPC . G06F 11/3684; G06F 11/3688; G06F 3/0484
See application file for complete search history.

(56) References Cited

U.S. PATENT DOCUMENTS

| 2018/0189170 | A1* | 7/2018 | Dwarakanath | ......... G06K 9/344 |
| 2019/0065354 | A1* | 2/2019 | Jakov | ...................... G06F 16/95 |
| 2020/0117577 | A1* | 4/2020 | Saxena | .................... G06N 3/08 |
| 2020/0174911 | A1* | 6/2020 | Ben Shabtai | ......... G06F 11/261 |

* cited by examiner

*Primary Examiner* — Joshua P Lottich
(74) *Attorney, Agent, or Firm* — Clayton, McKay & Bailey, PC (57) ABSTRACT

Examples described herein include systems and methods for test automation of a graphical user interface (GUI) using a screen element structure. The test automation can utilize a test script that identifies screen elements and corresponding actions to perform. The test script can identify screen elements with physical identifiers. The test automation can request the screen element structure from a server and retrieve one or more logical identifiers that correspond to the physical identifier. This can allow the test automation to use the logical identifier that is suitable for the particular GUI screen being tested and the automation platform itself. The test script can remain the same even when logical identifiers evolve since the screen element structure can be updated to include new logical identifiers.

20 Claims, 5 Drawing Sheets

TEST AUTOMATION SYSTEMS AND METHODS USING LOGICAL IDENTIFIERS

BACKGROUND

Mobile devices such as smartphones, tablet computers, and laptops have become extremely popular over the past several years. These devices typically include an operating system (OS) and various software applications that are used for performing a wide variety of tasks such as browsing the Internet and communicating with other users via email, text, and video. Two of the most popular operating systems are the iOS® used in Apple® products and Android® OS used in products made by various other vendors such as Samsung® and Google®. The software applications that run on various mobile devices are often designed to be compatible with a particular OS. Some portion or all of an application can be downloaded by a mobile device from one or more host servers via the Internet.

A software application can be revised or updated several times for various reasons such as to include new features or fix glitches. Each of the revised or updated software applications is generally identified by an identifier such as a version number. For example, a first release of a software application can be identified as version 1 software, a second release as version 2 software, and so on. One or more servers that operate as repositories for mobile device users to download the software application can contain the latest version of the software application and some or all of the previous versions. Some of the users may opt to download the latest version of the application software on a regular basis while some others may opt to do so infrequently. Consequently, various mobile devices, as well as various servers, may contain different versions of the software application.

The software applications are typically tested by using a test automation procedure. Many different testing automation solutions exist, each having their own way of performing actions on elements of the software. For example, various screen elements such as buttons, icons, and scroll bars that are operated by performing actions such as clicking, tapping, swiping, or scrolling. Each screen element is associated with an element identifier (element ID), which can be different in different operating systems and in different versions of the application software.

Test scripts can be written for the automated testing and reference the element ID and action to perform. However, companies incur significant overhead in updating these test scripts to operate correctly with each iteration of the software. For example, each version of the software can include new element IDs. Even though the test can otherwise be the same, the test script must be updated. This can happen each time the software application is updated for a new OS version or to add features. For example, OS versions can create their own interface flavors that change how elements are located or selected. Even the form factor of mobile devices can change how an element displays on a screen, and how the testing automation locates and acts on that element.

Additionally, portions of an application can be out of the tester's control. For example, web or hybrid applications can retrieve some or all screen elements from a web server. The web server can change the element IDs, causing the test script to not function without updating the element IDs accordingly. As the number and iterations of applications increase, the versions of test scripts also increase. Ultimately, this can lead to an unwieldy number of test scripts for running a single common test across multiple application versions.

Furthermore, if a company wishes to switch to a new testing automation platform, the existing test scripts may need rewriting. This is because different test automation platforms can use different approaches for referencing screen elements when performing testing actions. For example, the automation tools can rely on xPaths (a mechanism to map each element on a screen and generate a unique path), accessibility ids, text, resource id, or other element attributes. This can force a company to continue using an inferior testing automation platform to avoid the daunting task of converting test scripts for use by another potentially better testing automation platform.

In one traditional testing approach, different test scripts are created for different versions of an application. Consequently, when testing a particular version of the application, care has to be taken to ensure that the correct test script is selected for testing that version of the application. Storing and keeping track of the various test scripts and software versions can be labor-intensive and error-prone. Furthermore, it is cumbersome to maintain files for each version of the application and to carry out edits of these files.

Consequently, a need exists to provide testing procedures that address various shortcomings in existing test procedures for testing software applications.

SUMMARY

Examples described herein include systems and methods for testing a software application that includes as a graphical user interface ("GUI"). An example method can include receiving, from a testing device, a request for a screen element structure corresponding to a screen of the GUI. The screen includes one or more GUI elements being tested by the testing device based on a test script run by a testing automation software. The GUI elements can be, for example, buttons, tables, text boxes, and other features of the GUI.

In an example test procedure, the first screen element can have a logical identifier that is used by the testing automation software to locate the element during testing. The logical identifier for the element can be any element attribute, such as a resource ID, element ID, xPath, screen coordinates, text, or other element attributes. The same element can be referred to by different logical identifiers, depending on the testing automation, the OS version, application version, web server, or any other variable that can change how an element is physically identified on the screen. The testing device can be a workstation, a personal computer, a laptop computer, or a smartphone. The testing device can execute the test script that specifies GUI elements and actions to take with regard to such GUI elements.

The server provides a screen element structure for a GUI screen. For elements being tested, the screen element structure can map different logical identifiers to a physical identifier used in the test script. This can allow test scripts to be written based on a single physical identifier for a GUI element rather than logical identifiers, since logical identifiers may change based on OS version, application version, mobile device version, remote server changes, and other reasons. As a result, the test script can remain the same, while the automation platform can use whichever logical identifier corresponds to the physical identifier for that element. The screen element structure can relate multiple logical identifiers to a physical identifier. The test automation can make application programming interface calls to retrieve or locate a logical identifier used in the testing that corresponds to the physical identifier in the testing script. This can allow for the same testing script to be used across different application versions, OS versions, testing automation platforms, and the like without the constant rewrites required by existing systems.

A screen element structure can contain the physical identifier and multiple logical identifiers for each of multiple elements for a screen. The screen element structure can be retrieved in response to making the framework request from the testing device. The screen element structure, which can include information such as a first logical identifier associated with the first screen element, can be provided in various ways such as in the form of an extensible markup language (XML) file or a file in a JAVASCRIPT object notation (JSON). In one exemplary implementation, the screen element structure is generated by the server. In another exemplary implementation, the screen element structure is fetched from storage. The storage can be a memory device located in the server or can be a cloud storage element. In yet another example, the screen element structure can be provided locally on the testing device.

The method further includes selecting from the screen element structure, a logical identifier for use in performing an action that is specified for the GUI element in the test script. The first logical identifier can be selected based on a test-specific attribute and the physical identifier. The testing device then uses the first logical identifier to perform the action on the GUI element.

The example method summarized above can be incorporated into a non-transitory, computer-readable medium having instructions that, when executed by a processor associated with a computing device, cause the processor to perform the actions described. Additionally, the example method summarized above can be implemented in a system including, for example, a testing device, a server, and cloud storage that are communicatively coupled to each other through a network.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts. Certain words that are used in this disclosure can have various equivalencies and are not intended to be limiting or exclusionary.

Examples described herein include systems and methods for carrying out a test automation on a graphical user interface (GUI) application executed in a mobile device such as a smartphone, for example. The test automation procedure incorporates a framework request that is transmitted by a testing device to a server during a run time of the test automation so as to dynamically obtain information about one or more screen elements of the GUI. Each screen element displayed on the GUI can have various attributes, such as a physical identifier. The information provided by the server to the testing device can identify a screen element on a screen based on a physical identifier. The physical identifier can be referenced in a test script. Additionally, the information from the server can include one or more logical identifiers for the screen element, which can correspond to multiple versions of the screen element.

The test automation can execute the test script by retrieving a logical identifier for the screen element based on the physical identifier in the test script. This can allow for automated testing using the same test script for multiple versions of an application or with different test automation environments. In one example, this also relieves developers from the task of updating test scripts every time a physical identifier of the screen element changes or each time an organization changes to a new test automation platform.

Figure 1:
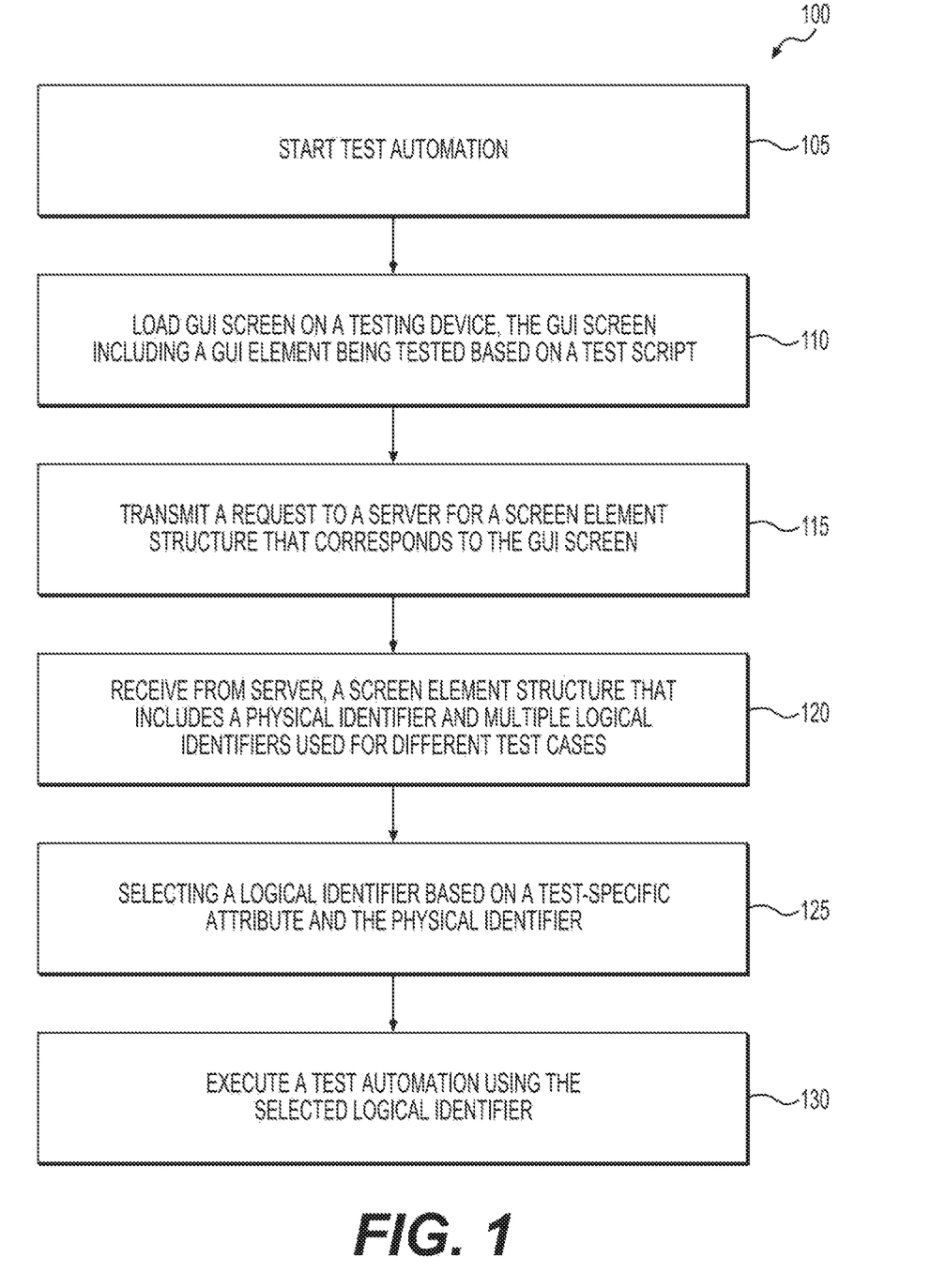
FIG. 1 is a flowchart of an example method for executing a test automation upon a graphical user interface (GUI) in accordance with the disclosure.

FIG. 1 is a flowchart 100 of an example method for executing a test automation for a graphical user interface (GUI) in accordance with the disclosure. At stage 105, a test automation is initiated for testing the GUI that is to be run on a mobile device. The mobile device can be any processor-based device, such as a phone, laptop, or tablet. The test automation can be an application that tests features of the GUI, such as workflows, to ensure that an application operates correctly. The test automation can utilize a test script that specifies which features to test and in which order. The test script can include classes for each GUI screen to define which screen elements to select and which actions to perform on those screen elements. The test automation can execute on any processor-enabled device, such as a workstation, a personal computer, or a user device.

At stage 110, a GUI screen is loaded on to the testing device. Depending on the automation software, the loaded GUI screen can either be visible or generated in an application that does not show the GUI screen on a display for testing purposes. The GUI screen can include some or all functionalities of the GUI when used on the mobile device. The functionalities of the GUI can be activated by carrying out various operations such as touching, tapping, clicking, swiping, and scrolling on screen elements displayed in the GUI screen. For example, the GUI screen can include a first screen element, such as a button, that is associated with a "Settings" application on the mobile device. Upon touching the first screen element on a mobile device, the "Settings" screen opens up and displays various additional screen elements associated with operations of the mobile device (for example, remaining battery life, screen brightness, and airplane mode). The test automation can simulate the action of touching the "Settings" button during testing of this screen element.

A test script can specify which screen elements and actions are performed. The test script can use physical identifiers to reference the screen elements. The screen element itself can be identified in the application by one or more different logical identifiers, such as an xPath or ID. These logical identifiers can differ between iterations of the GUI being tested, such as when an ID is generated differently by different web servers or the screen element is located at a different location based on the screen size of the device on which the GUI runs. In another example, logical identifiers can differ for a screen element between different versions of the application being tested. The physical identifier can remain the same, allowing for the same test script to be used for different versions of the tested application. Alternatively, different physical identifiers can be used for test scripts that are specific to different application versions.

In one example, the GUI screen can include a second screen element that is associated with a web application. Upon touching the second screen element on a mobile device, a web browser screen can be displayed. Various screen elements of the Web browser can be used for communications and functions executed over the Internet (for example, accessing a news website or sending out an email). A screen object of the Web browser can be placed as a shortcut screen element on the home screen of the mobile device. Touching the shortcut screen element on the home screen, an email icon for example, brings up a page of the Web browser associated with the email utility (for example, Google Chrome® or Netscape Firefox®). The test automation can simulate the action of touching this screen element for opening a browser during testing of the screen element. The second screen element can have a physical identifier that is different than the physical identifier of the first screen element. The second screen element can include more than one logical identifier. For example, the first test script can include a first logical identifier that indicates a version 1 of the second screen element, the second test script can include a second logical identifier that indicates a version 2 of the second screen element, and so on.

At stage 115, a framework request is transmitted from the test platform to a server. The server can be a management server, an administrative server, or a host server that is communicatively coupled to the test platform through a network such as the Internet, a corporate wide area network (WAN, or a local area network (LAN). The framework request can be made by the automation platform, in an example, based on instructions in a test script. For example, the test script can include a screen class that includes application programming interface (API) calls to the server for retrieving a screen element structure. The screen element structure can include information about the screen elements on the screen being tested. For example, the screen element structure can map a physical identifier used in the test script to multiple logical identifiers used to identify the screen element in GUI screen. The testing platform can use one or more of these logical identifiers to locate the screen element for purposes of performing an action in the test script.

In one example, the framework request is transmitted during a run-time of the test automation for obtaining information about one or more screen elements of the GUI (screen object). The information can include various attributes of a screen element such as one or more version numbers, a physical identifier, a class name, and a label. The frame request, which can include one or more API calls, can be agnostic to the type of application being tested. For example, the frame request can be made with respect to any type of application, such as native, hybrid, or web. The various types of applications are described below in more detail.

At stage 120, the server responds to the framework request by transmitting to the hardware test platform, a screen element structure that provides information about the various screen elements requested by the test automation. In one example implementation, the screen element structure is provided in the form of an extensible markup language (XML) file or a JAVASCRIPT object notation (JSON) file.

An example screen element structure in XML/JSON is shown below in Table 1:

TABLE 1

```
<screen>
    <screenId>loginScreen</screenId>
    <screenName>Login Screen</screenName>
    <screenVersion>1.0</screenVersion>
    <element>
        <id>SIGNIN_BUTTON</id>
        <version>1.0</version>
        <resource-id></resource-id>
        <className></className>
        <accLabel></accLabel>
        <accName></accName>
        <accValue></accValue>
        <content-desc></content-desc>
        <xpath>
            <deviceType>phone</deviceType>
            <type>WEB</type>
            <value>//*[@id='signIn']</value>
        </xpath>
        <xpath>
            <deviceType>phone</deviceType>
            <type>NATIVE</type>
            <value>//*[@text='Sign in']</value>
        </xpath>
        <rect>
            <x></x>
            <y></y>
            <width></width>
            <height></height>
        </rect>
    </element>
    <element>
        <id>LOGIN_BUTTON</id>
        <version>2.0</version>
        <xpath>
            <deviceType>phone</deviceType>
            <type>WEB</type>
            <value>//*[@id='logIn']</value>
        </xpath>
    </element>
</screen>
```

The example screen structure includes version 1.0 of a first screen. This screen includes at least two elements, the first screen element having a first logical identifier "SIGN-IN_BUTTON" and the second screen element having a second logical identifier of "LOGIN_BUTTON." There are two different types of the SIGNIN_BUTTON (a Web type and a Native type). The SIGNIN_BUTTON includes multiple physical identifiers for version 1. Additional physical identifiers can be provided for other versions, such as the version 2 shown for LOGIN_BUTTON.

The physical identifiers shown in the screen element structure of Table 1 include resource-id, which can be an identifier for the element used, for example, in hyper text or some other code; className, which can define the class of the element; accLabel, which can be an accessibility label for the element; accName, which can be an accessibility name of the element; accValue, which can be an accessibility value for the element; content-desc, which can be content description associated with the element; xpath, which can be used by the testing automation platform to identify an element location for different application or device types; and rect, which can provide physical dimensions or coordinates for the screen element. Accessibility labels, names, and values can be accessible attributes of the screen element that can be read by the automation platform. In one example, the rect physical identifier provides information about the dimensions of a rectangle that is indicative of a screen element that is either undefined in terms of functionality or does not contain an image indicative of a functionality.

At stage 125, the testing automation platform can use any one or more of these physical identifiers to locate the screen element on the GUI, based on a test-specific attribute. The test-specific attribute can include the version of the application being tested (e.g., version 1.0 or 2.0), application type (e.g., Web or Native), and the type of physical identifier used by the automation software (e.g., xPath or resource-id).

To locate the correct logical identifier for use in performing the action in the test script, the test automation platform can parse the screen elements contained in the screen element structure. In one example, the API can be used for this purpose. For example, API calls can be used to retrieve a particular type of logical identifier corresponding to the physical identifier in the test script. The API calls can be based on one or more test-specific attributes, such as version, logical identifier type, and test device type. The parsing operation associates the one or more logical identifiers contained in the screen element structure with the physical identifiers associated with the respective screen elements displayed in the GUI that is being tested.

As an example, in Table 1, a test automation platform can retrieve the logical identifiers for the SIGNIN_BUTTON in the test script. This can include making an API call for the xPath type. Additionally, an API call for a "phone" device-Type and "Web" component type (or application type). The resulting logical identifier can be the xPath value "//*[@id='signIn']," which the test automation platform can used to locate the screen element.

At stage 130, the test automation can perform the action on the screen element by using the retrieved logical identifier. the various characteristics and functionalities of the GUI is tested by using the selected logical identifiers. For example, a first logical identifier (Version 1) can be used to test the first screen element described above, and a second logical identifier (Version 2) can be used to test the second screen element described above. The test automation can include a test script or an API that interacts with an object such as the GUI screen for testing one or more of the screen elements contained in the object. The testing can be carried out without burdening a developer or tester with the task of updating and matching the physical identifier of the screen element to the various logical identifiers that can be present in the various versions of the software elements stored in the server or elsewhere such as in a cloud storage element.

Figure 2:
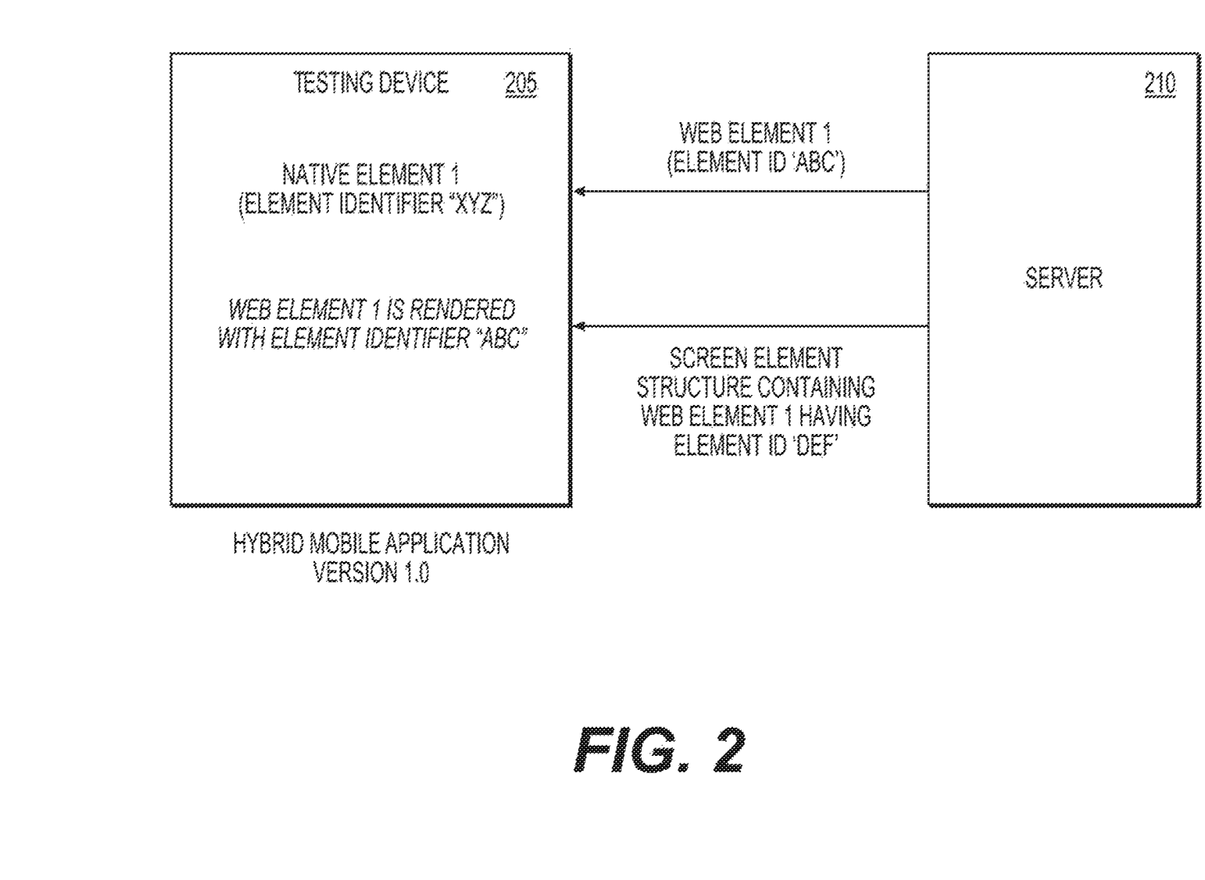
FIG. 2 is an illustration of an example test automation configuration.

FIG. 2 illustrates an example test automation configuration that involves testing of a GUI. A hardware testing device 205 such as a work station or a personal computer (PC) can be used to render a simulated image of the GUI as a screen object for purposes of executing the test automation upon the GUI. The simulated GUI can include various elements, such as buttons, icons, scroll-bars, and text entry boxes that are a part of the GUI. Some of these elements can be native elements such as a Native Element 1 that has an element identifier (ID) "xyz." A native element can be developed for a specific operating system (OS) such as ANDROID or an iOS®. The native element is typically developed for use inside a native application executed on a hardware platform running the compatible OS.

Some of the other elements of the simulated GUI can be either Web elements or hybrid elements. A Web element is typically designed for use inside a Web-optimized browser operated on a mobile device. A user may opt to create a shortcut for a web element and place the shortcut on a desktop outside the web-optimized browser.

A hybrid application is partly web and partly native in nature. Accordingly, a hybrid application can include a combination of web elements and native elements. A developer can opt to use a native element to implement a first function inside an GUI and can fetch a web element from a server for implementing a second function inside the GUI. The web element provided by the server is rendered in the GUI and can be used to carry out the second function.

The operations indicated by stage 115, stage 120, and stage 125 of the flowchart 100 of FIG. 1 can be carried out dynamically during the run time of the test automation in accordance with the disclosure provides various advantages over traditional solutions. For example, this set of operations eliminates the need to store the element identifiers and version information in a database or to update the element identifiers and the version information in a database prior to using the information in the test automation. Storing, tracking, and updating the element identifiers and version information can be expensive, time-consuming and error-prone. Furthermore, the test automation in accordance with the disclosure can be executed any number of times without necessitating modification of the test automation each time an element identifier or version is changed.

The example illustration shown in FIG. 2 includes a first web element ("Web Element 1") that is imported into the GUI from a server 210 for a hybrid mobile application (version 1.0). The first web element has an element ID "abc" that is provided by the server 210 running web server version 1.0. The first web element having the element ID "abc" is shown rendered in the GUI. The element ID can be a logical identifier.

At a later instant in time, a second version of the web element ("Web Element 1") having an element ID "def" can be provided by the server 210, for example, as a part of the screen element structure. The server 210 is running a web server version 2.0 at this time. The GUI will have two versions of the first web element with two different element ID values (logical element values). Consequently, the various element IDs have to be taken into consideration when a test automation is executed for testing the GUI.

To do this, the test script or test automation platform can provide a version number used in the test. The version number can reflect a version of the application being tested. Using a testing device 205 that sends out a framework request to the server 210 when running the test automation ensures that the most suitable web element, as well as native and hybrid screen elements, are used in accordance with the disclosure.

The framework request can be directed at obtaining various types of information from the server 210. A few examples of items that can be included in a framework request are: getElementId( ), get ResourceId( ), getElementClassName( ), getElementAccessibilityLabel( ) getElementVersion( ), getElementContentDescription( ), getElementImagePath( ), getAllXPaths( ) getXPathsForElementType( ), getxPathsForDeviceTypeAndElementType( ), getElementRect( ) getScree( ), constructXPathFromList( ), and getElementForVersion( ).

Among these examples, the getAllXPaths( ) frame request is directed at obtaining from the server 210, all XPaths for all screen elements that are used in the GUI. The getElementVersion( ) frame request is directed at obtaining from the server, version information for a screen element. The getElementRect( ) frame request is directed at obtaining from the server, information about the dimensions of a rectangular box that represents an outline of a screen element. The rectangular box can be used by the test automation to perform simulated operations at the location of the box for test purposes.

Figure 3:
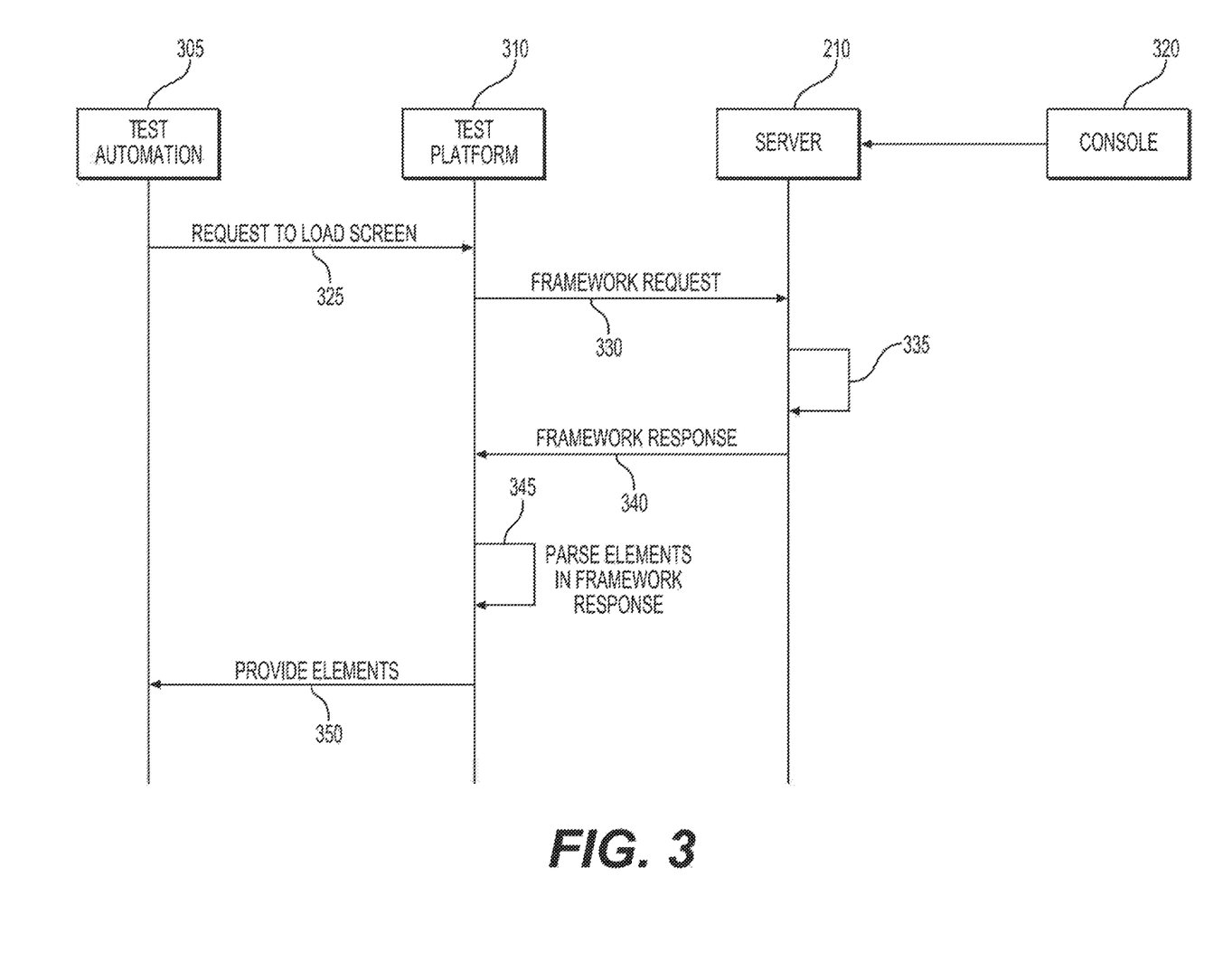
FIG. 3 is an example sequence diagram for testing a GUI using logical identifiers in accordance with the disclosure.

FIG. 3 is an example sequence diagram for testing a GUI by using dynamically obtained logical identifiers through use of a screen element structure retrieved by a framework request. Test automation process 305 can execute a test script that includes actions to take with respect to one or more screen elements on a GUI screen. The test script can refer to the screen elements using physical identifiers. At stage 325, the test automation process 305 can execute on the hardware test platform 310 and initiate a request to load the GUI screen indicated by the test script. The hardware test platform 310 can be the testing device 205, such as a workstation, a personal computer, or a user device.

At stage 330, a framework request can be transmitted by the hardware test platform 310 to the server 210 during a run-time of the test automation. For example, an API request can be sent to the server 210. The framework request can identify the GUI screen.

At stage 335, the server 210 can respond to the framework request by retrieving a screen element structure for the GUI screen. This can include information such as screen elements identifier by physical identifiers. The screen element structure can include version information of one or screen elements referenced in the framework request. The framework request can include multiple different API calls in one example. This can narrow the type of logical identifiers returned in the screen element structure. For example, getXPaths( ) can return the XPaths available for the screen elements on the GUI screen. The format can still be maintained such that XPaths are organized by physical identifier, in an example.

At stage 340, the server 210 can transmit a framework response to the hardware test platform 310, the framework response containing some or all of the screen element structure. This can include information such as physical identifiers and version information of one or screen elements referenced in the framework request. In one exemplary implementation, the framework response is a screen element structure provided in the form of an XML file or a JSON file such as the example file described above.

At stage 345, the test automation parses the received screen element structure for running tests on one or more screen elements of the GUI displayed on the hardware test platform 310. The parsing can be carried out by the test automation by using an API such as the example shown below:

TABLE 2

Name of file: LoginScreen.xml
//This will load the screen xml/j son file into memory
Final String resource = APICall.getScreenElementsFor
('LoginScreen', 'version
1.0')
ScreenLoader screenObj = getScreen(resource);
//This will create a list of all possible xpaths defined in screen file.
Final List<String> xPathList =
screenObj.getElementForId("SIGNIN_BUTTON").
getXPathsForElementType("
NATIVE");
//This will construct one xpath from the given list of xpaths.
String xPath = constructXPathFromList(xPathList);

At stage 350, one or more results of the parsing, such as for constructing an xpath indicated in the example above, can be provided to the test automation 305.

In one example, the server 210 can be accessed by an administrator via a console 320 for various purposes such as for editing, updating, or revising the screen element structure (an XML file, for example). This can allow the administrator to add additional logical identifiers to a physical identifier. In this way, as additional iterations of a screen element become known, the correlations to the physical identifier can be updated without a need to update the potentially numerous test scripts that utilize the physical identifier.

Figure 4:
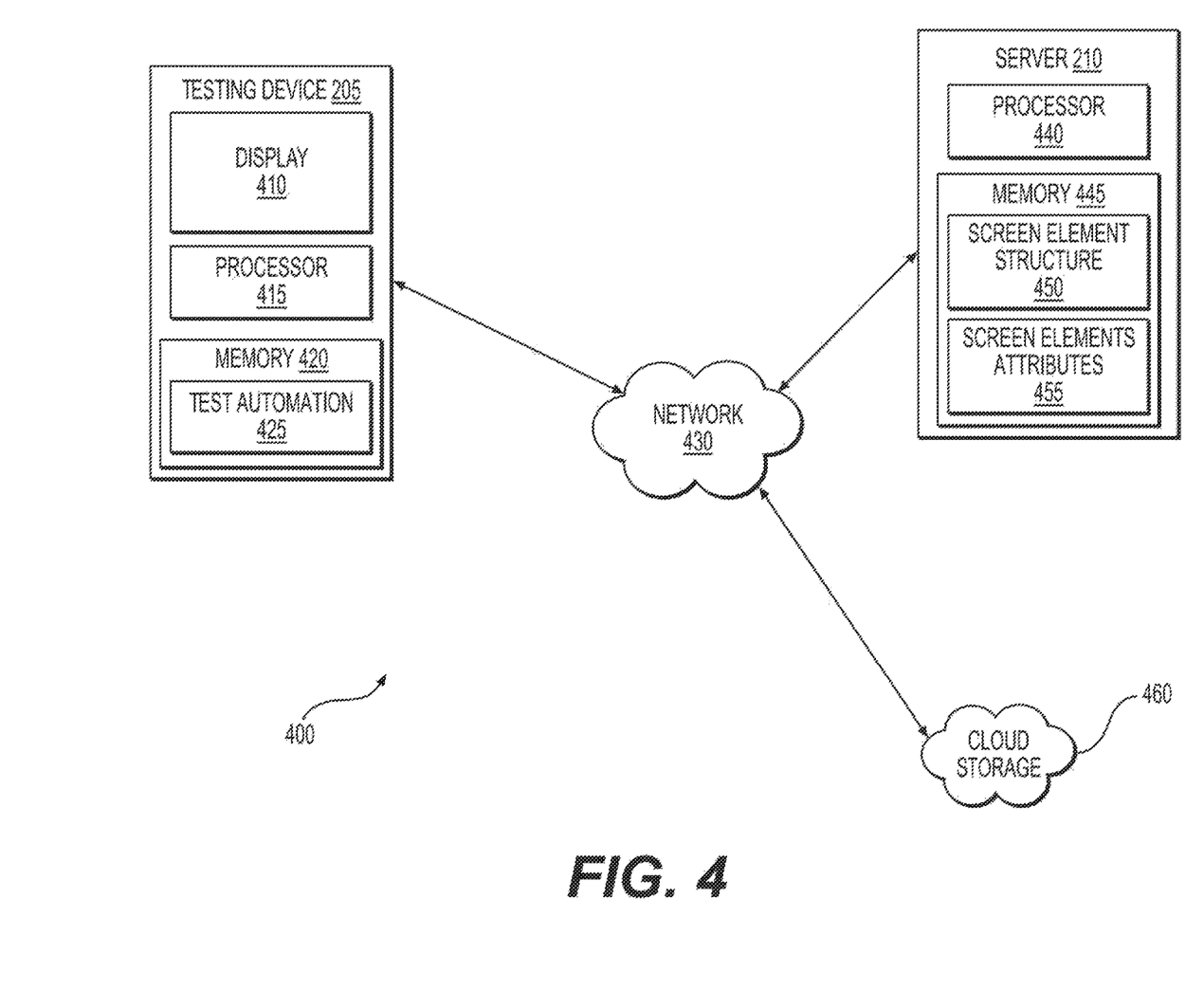
FIG. 4 is an illustration of exemplary system components for executing a test automation upon a mobile device in accordance with the disclosure.

FIG. 4 illustrates an exemplary system 400 configured for executing a test automation to test a GUI screen. In one exemplary embodiment, the user interface is a GUI displayed upon a mobile device. The system 400 can at least include the testing device 205 communicatively coupled to the server 210 via a network 430. The system 400 can also include various other elements such as a cloud storage 460. Though shown as single blocks or entities, the elements and components shown in FIG. 4 can be implemented using multiple elements and configurations. For example, each of the testing device 205, the server 210, and the cloud storage 460 can be implemented in the form of a network of multiple computers, servers, or storage elements that are communicatively coupled to each other. In some examples, the testing device 205 and the server 210 can be a part of the same computer system.

In one example, the server 210 includes a processor 440 and a memory 445. The memory 445 can be implemented in various ways such as in the form of one or more memory devices mounted upon a printed circuit board located in the server 210 or in the form of a distributed architecture that can include the cloud storage 460. The processor 440 can access the memory 445 to execute non-transitory instructions stored in the memory 445 for implementing various software programs such as used for implementing the test automation. For example, the processor 440 can access the memory 445 to execute non-transitory instructions for generating a screen element structure 450 that can be provided to the testing device 205 in response to a frame request transmitted by the testing device 205 to the server 210. The screen element structure can include some or all of the screen element attributes 455 associated with some or all screen elements included in the screen element structure 450.

The testing device 205 can be any hardware test platform such as a workstation, a personal computer, or a user device (such as a smartphone). In one example implementation, the testing device 205 includes a display 410, a processor 415, and a memory 420. The processor 415 can access the memory 420 to execute non-transitory instructions stored in the memory 420 for implementing various software programs such as the test automation 425. The GUI screen that is tested by the test automation 425 can be displayed on the display 410.

The memory 420 can also be used to store various applications and programs such as an operating system (Android or iOS®), an email application (for example, Microsoft Outlook® or Gmail®), a word processor (Microsoft Word® for example), and a web browser (for example, Mozilla Firefox® or Google Chrome®). Some or all of these programs and applications can be tailored for use on a smartphone when the testing device 205 is a smartphone. These tailored versions, which can be more compact and have a form factor suited for display on a display screen of a smartphone, can be different from the versions that are executed in a laptop computer or desktop computer.

Figure 5:
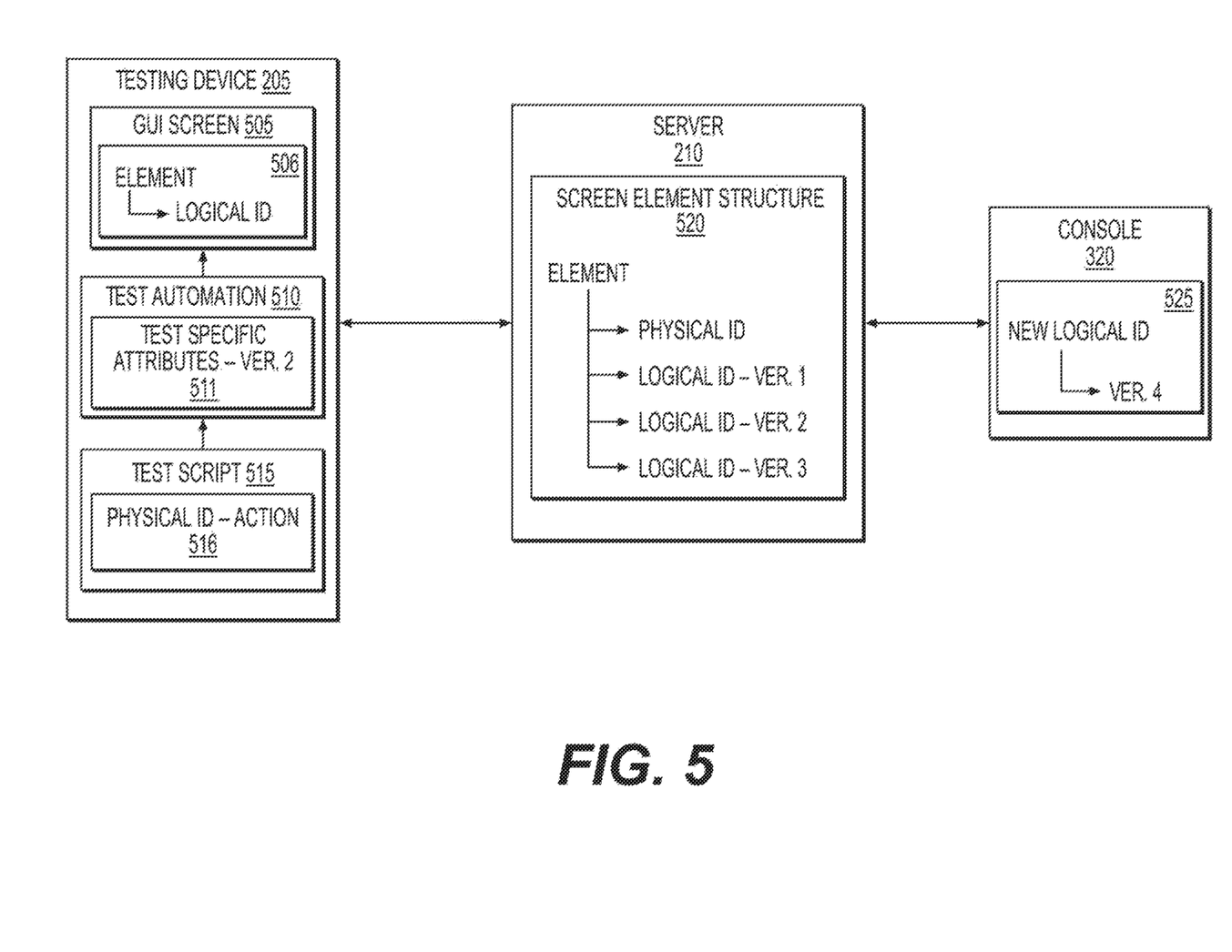
FIG. 5 is an illustration of exemplary system components for executing a test automation procedure in accordance with the disclosure.

FIG. 5 is an exemplary illustration of a configuration used for executing a test automation procedure. In this example, the testing device 205 can test a GUI screen 505 that is populated with one or more screen elements such as an exemplary screen element 506. The screen element 506 includes a unique logical identifier, such as an attribute ID. The testing device can execute a test script 515 for carrying out a testing procedure upon the GUI screen 505. This can include performing some action using screen element 506. The test script 515 can identify a physical ID 516 of the screen element 506 and action to perform with that screen element 506. The action can be, for example, to click, delete, type, drag, or perform any other action that a user might perform and that may need testing. The screen element 506 can be tested using various test scripts that refer to the screen element 506 by using a physical identifier. This can allow the test script to be written without regard to evolving logical identifiers of the screen element 506.

The test automation 510 can define certain test specific attributes 511 that apply to the test. For example, the test script 515 can indicate a version of the application being tested. The version can be used as a test-specific attribute when correlating the physical identifier of the test script to a logical identifier used by the test automation platform. In the example shown, a test attribute of version 2 is used for testing the screen element 506.

The test automation 510 carries out the determination by receiving from the server 210, a screen element structure 520 for the screen element 506. The screen element structure 520 includes a physical identifier. In this example, the physical identifier is associated with three logical identifiers. The test automation 510 determines which of the three logical identifiers is applicable for executing the test script 515. In addition to using version 2, as described above, the test automation can further narrow the logical identifier based on other test-specific attributes. For example, the test automation can specify the type of logical identifier. For example, some automation platforms use XPath while others utilize an attribute ID.

The console 320 can be used by a person such as an administrator to add into the server 210 another logical identifier 525 that corresponds to the physical identifier of element 520. In this example, the new logical identifier corresponds to a fourth version. The additional logical version 525 is associated with the physical identifier of the screen element 506 already present in the server 210.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather, any feature of any example described here can be incorporated into any other suitable example. It is intended that the specification and examples be considered as exemplary only, with a true scope and spirit of the disclosure being indicated by the following claims.

What is claimed is:

1. A method for automated testing, the method comprising:

receiving, from a testing device, a request for a screen element structure corresponding to a screen of a graphical user interface ("GUI"), wherein the screen includes a GUI element being tested by the testing device based on a test script;

retrieving the screen element structure corresponding to the screen, the screen element structure associating the GUI element with at least:

a physical identifier used to identify the GUI element in the test script, and multiple logical identifiers used for different test cases; and selecting, from the screen element structure, a first logical identifier for use in performing an action that is specified for the GUI element in the test script, the first logical identifier being selected based on a test-specific attribute and the physical identifier, wherein the test device uses the first logical identifier to perform the action on the GUI element.

2. The method of claim 1, further comprising:

receiving, from a console, an additional logical identifier that corresponds to the first logical identifier;

dynamically updating the screen element structure by adding the additional logical identifier to the element; and in response to a second framework request, providing the updated screen element structure for use in retrieving the additional logical identifier based on the physical identifier.

3. The method of claim 1, wherein the test-specific attribute is used to select the first logical identifier used by the test device from between the first logical identifier and a second logical identifier, the first logical identifier and the second logical identifier representing different xPath values.

4. The method of claim 1, wherein the test-specific attribute is a version of the GUI, wherein at least two of the multiple logical identifiers of the screen element structure correspond to different GUI versions.

5. The method of claim 1, wherein the test-specific attribute specifies a native type for the element, wherein the screen element structure includes the first logical identifier for the native type and a second logical identifier for a web type.

6. The method of claim 1, wherein retrieving the screen element structure comprises an application programming interface ("API") call from the test device to a server, and wherein the API call is based on the physical identifier and the test-specific attribute.

7. The method of claim 1, wherein the first logical identifier is one of a resource identifier, an accessibility label, an image path, an xpath, and coordinates.

8. A non-transitory, computer-readable medium comprising instructions that, when executed by a processor of a server, cause the server to perform stages for testing a graphical user interface ("GUI"), the stages comprising:

receiving, from a testing device, a request for a screen element structure corresponding to a screen of a graphical user interface ("GUI"), wherein the screen includes a GUI element being tested by the testing device based on a test script;

retrieving the screen element structure corresponding to the screen, the screen element structure associating the GUI element with at least:

a physical identifier used to identify the GUI element in the test script, and multiple logical identifiers used for different test cases; and selecting, from the screen element structure, a first logical identifier for use in performing an action that is specified for the GUI element in the test script, the first logical identifier being selected based on a test-specific attribute and the physical identifier, wherein the test device uses the first logical identifier to perform the action on the GUI element.

9. The non-transitory, computer-readable medium of claim 8, the stages further comprising:

receiving, from a console, an additional logical identifier that corresponds to the first logical identifier;

dynamically updating the screen element structure by adding the additional logical identifier to the element; and in response to a second framework request, providing the updated screen element structure for use in retrieving the additional logical identifier based on the physical identifier.

10. The non-transitory, computer-readable medium of claim 8, wherein the test-specific attribute is used to select the first logical identifier used by the test device from between the first logical identifier and a second logical identifier, the first logical identifier and the second logical identifier representing different xPath values.

11. The non-transitory, computer-readable medium of claim 8, wherein the test-specific attribute is a version of the GUI, wherein at least two of the multiple logical identifiers of the screen element structure correspond to different GUI versions.

12. The non-transitory, computer-readable medium of claim 8, wherein the test-specific attribute specifies a native type for the element, wherein the screen element structure includes the first logical identifier for the native type and a second logical identifier for a web type.

13. The non-transitory, computer-readable medium of claim 8, wherein retrieving the screen element structure comprises an application programming interface ("API") call from the test device to a server, and wherein the API call is based on the physical identifier and the test-specific attribute.

14. The non-transitory, computer-readable medium of claim 8, wherein the first logical identifier is one of a resource identifier, an accessibility label, an image path, an xpath, and coordinates.

15. A computer system for testing a graphical user interface ("GUI"), comprising:

a memory storage including a non-transitory, computer-readable medium comprising instructions; and a processor that executes the instructions to carry out stages comprising:

receiving, from a testing device, a request for a screen element structure corresponding to a screen of a graphical user interface ("GUI"), wherein the screen includes a GUI element being tested by the testing device based on a test script;

retrieving the screen element structure corresponding to the screen, the screen element structure associating the GUI element with at least:

a physical identifier used to identify the GUI element in the test script, and multiple logical identifiers used for different test cases; and selecting, from the screen element structure, a first logical identifier for use in performing an action that is specified for the GUI element in the test script, the first logical identifier being selected based on a test-specific attribute and the physical identifier, wherein the test device uses the first logical identifier to perform the action on the GUI element.

16. The computer system of claim 15, the stages further comprising:

receiving, from a console, an additional logical identifier that corresponds to the first logical identifier;

dynamically updating the screen element structure by adding the additional logical identifier to the element; and in response to a second framework request, providing the updated screen element structure for use in retrieving the additional logical identifier based on the physical identifier.

17. The computer system of claim 15, wherein the test-specific attribute is used to select the first logical identifier used by the test device from between the first logical identifier and a second logical identifier, the first logical identifier and the second logical identifier representing different xPath values.

18. The computer system of claim 15, wherein the test-specific attribute is a version of the GUI, wherein at least two of the multiple logical identifiers of the screen element structure correspond to different GUI versions.

19. The computer system of claim 15, wherein the test-specific attribute specifies a native type for the element, wherein the screen element structure includes the first logical identifier for the native type and a second logical identifier for a web type.

20. The computer system of claim 15, wherein retrieving the screen element structure comprises an application programming interface ("API") call from the test device to a server, and wherein the API call is based on the physical identifier and the test-specific attribute.

\* \* \* \* \*